(12) United States Patent
Sloan et al.

(10) Patent No.: US 11,745,112 B2
(45) Date of Patent: *Sep. 5, 2023

(54) METHOD AND DEVICE FOR FANTASY SPORTS PLAYER RECOMMENDATIONS

(71) Applicant: Disney Enterprises, Inc., Burbank, CA (US)

(72) Inventors: J. Nathaniel Sloan, Bellevue, WA (US); David Michael Fishel, Farmington, CT (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/994,200

(22) Filed: Aug. 14, 2020

(65) Prior Publication Data

US 2020/0376393 A1 Dec. 3, 2020

Related U.S. Application Data

(63) Continuation of application No. 13/528,275, filed on Jun. 20, 2012, now Pat. No. 10,744,415.
(Continued)

(51) Int. Cl.
| | |
|---|---|
| *A63F 13/828* | (2014.01) |
| *A63F 13/79* | (2014.01) |
| *A63F 13/85* | (2014.01) |
| *A63F 13/00* | (2014.01) |
| *A63F 13/44* | (2014.01) |
| *A63F 13/46* | (2014.01) |
| *A63F 13/798* | (2014.01) |

(52) U.S. Cl.
CPC ............ *A63F 13/828* (2014.09); *A63F 13/00* (2013.01); *A63F 13/44* (2014.09); *A63F 13/46* (2014.09); *A63F 13/79* (2014.09); *A63F 13/798* (2014.09); *A63F 13/85* (2014.09); *A63F 2300/558* (2013.01); *A63F 2300/575* (2013.01)

(58) Field of Classification Search
CPC .................................................... A63F 13/828
See application file for complete search history.

(56) References Cited

U.S. PATENT DOCUMENTS

| | | | |
|---|---|---|---|
| 6,371,855 B1 * | 4/2002 | Gavriloff | ............... A63F 13/12 463/42 |
| 7,618,312 B1 * | 11/2009 | Kasten | .................... A63F 13/12 463/7 |

(Continued)

*Primary Examiner* — Seng H Lim
(74) *Attorney, Agent, or Firm* — Fay Kaplun & Marcin, LLP

(57) ABSTRACT

A method and device generates a fantasy sports recommendation. The method includes receiving a plurality of ranking values associated with a sport player, each of the ranking values being generated from a respective source. The method includes assigning a weight value to each of the ranking values, the weight value being associated with the respective source. The method includes generating a recommendation value for the sport player as a function of the ranking values and the corresponding weight values. The method includes receiving a selection value for the sport player. The method includes determining a further weight value for each of the sources as a function of the selection value, the recommendation value, and the weight value for the corresponding source.

19 Claims, 6 Drawing Sheets

Related U.S. Application Data

(60) Provisional application No. 61/500,018, filed on Jun. 22, 2011.

(56) References Cited

U.S. PATENT DOCUMENTS

| | | | | |
|---|---|---|---|---|
| 7,699,707 B2* | 4/2010 | Bahou | | A63F 13/828 |
| | | | | 463/42 |
| 7,922,570 B2* | 4/2011 | Del Prado | | A63F 13/87 |
| | | | | 463/4 |
| 7,945,503 B2* | 5/2011 | Gottlieb | | G06Q 30/08 |
| | | | | 705/37 |
| 8,052,521 B2* | 11/2011 | Webb | | A63F 13/79 |
| | | | | 463/25 |
| 8,099,182 B1* | 1/2012 | Kasten | | A63F 13/65 |
| | | | | 700/91 |
| 8,353,772 B2* | 1/2013 | Callery | | G07F 17/32 |
| | | | | 463/42 |
| 2004/0110552 A1* | 6/2004 | Del Prado | | A63F 13/795 |
| | | | | 463/4 |
| 2007/0054718 A1* | 3/2007 | Del Prado | | A63F 13/792 |
| | | | | 463/1 |
| 2008/0234048 A1* | 9/2008 | Gottlieb | | G06Q 40/025 |
| | | | | 463/42 |
| 2008/0281974 A1* | 11/2008 | Slothouber | | G06F 16/9535 |
| | | | | 709/229 |
| 2009/0023495 A1* | 1/2009 | Koustas | | G07F 17/3288 |
| | | | | 463/25 |
| 2009/0325685 A1* | 12/2009 | Webb | | A63F 13/828 |
| | | | | 463/25 |
| 2010/0093415 A1* | 4/2010 | Kasten | | A63F 13/12 |
| | | | | 463/9 |
| 2011/0034225 A1* | 2/2011 | Butz, Jr. | | A63F 13/75 |
| | | | | 463/4 |
| 2011/0053684 A1* | 3/2011 | Attwood | | G07F 17/32 |
| | | | | 463/28 |
| 2012/0071219 A1* | 3/2012 | Belmarch | | A63F 13/537 |
| | | | | 463/2 |
| 2012/0149472 A1* | 6/2012 | Miller | | A63F 13/798 |
| | | | | 463/42 |
| 2012/0330444 A1* | 12/2012 | Sloan | | A63F 13/65 |
| | | | | 700/92 |

* cited by examiner

METHOD AND DEVICE FOR FANTASY SPORTS PLAYER RECOMMENDATIONS

PRIORITY CLAIM

This invention claims priority to U.S. Provisional Application Ser. No. 61/500,018 entitled "Automated Fantasy Draft Player Recommendations", filed Jun. 22, 2011, the disclosure of which is incorporated, in its entirety, herein.

INCORPORATION BY REFERENCE

The entire disclosures of U.S. patent application Ser. No. 13/331,894, filed Dec. 20, 2011, U.S. patent application Ser. No. 12/760,277, filed Apr. 14, 2010, U.S. patent application Ser. No. 12/760,422, filed Apr. 14, 2010, U.S. patent application Ser. No. 12/760,384, filed Apr. 14, 2010, and U.S. patent application Ser. No. 14/760,269, filed Apr. 14, 2010, including the specification, claims, and abstract, all of which share at least one common inventor and are assigned to a common assignee with the present application, are hereby expressly incorporated by reference herein.

FIELD OF THE INVENTION

This present invention pertains to the field of fantasy sports games. The exemplary embodiments relate to a method and system for providing recommendations, in particular for drafting or managing a player in a fantasy sports team by adjusting a weight applied to recommendation algorithms used to generate the recommendations.

BACKGROUND INFORMATION

A fantasy sports game is a simulation game where users act as managers or owners of simulated sport teams called "fantasy teams," where each team comprises a number of "players." Thus, the term "owner" is used to refer to a participant in the fantasy sports game. An owner may be a natural person or a computer-controlled opponent. A "user" is a fantasy owner who is also a natural person. Thus, the term "user" and "owner" are used interchangeably in their roles in the fantasy sports game. In contrast, the term "player" refers to one of the selectable fantasy characters. In certain fantasy sports games, each player corresponds to an athlete in a professional sports league.

Features for conventional fantasy sports games are already known in the art. In a first example, a player evaluation system uses historical data to predict player performance through the end of the season using a blending function. The system is also applied in a draft context by assigning average performance values to the slots on the owner's team that have not yet been filled with players yet to be drafted. In calculating team points, one version weighs certain statistics more heavily than others.

In another conventional feature for a fantasy sports game, a system uses draft position information to make draft recommendations. The draft position information is used to determine the likelihood that a given player, or a class of players, will be available. The draft position information may be used to provide recommendations and information predictive of the available player pool at the time of a given user-participant's draft positions, or at the time of other draft positions. Two common methodologies used for this type of system is Value Based Drafting ("VBD") or Dynamic VBD ("DVBD"). A player valuation module uses dynamic player valuation, including a durability parameter, a consistency parameter, and a strength of opponents' defenses parameter.

Conventional recommendation engines are also known in the art. An example of such an engine utilizes historical information about competitors' past picks and performance in a fantasy league to determine the methodology the competitor is using to make picks, specifically attempting to match past picks with certain experts to determine which expert's advice the competitor is most likely following. In another conventional recommendation engine, the players on the current roster are compared to the best available players to make a recommendation. In yet another conventional recommendation engine, player analyzing software queries a sports statistics system to analyze the relevant players and delivers the analysis to a roster move recommending software component that delivers to the user roster move recommendations based on the results of the player analysis. The player analysis may be based on actual statistics or projected statistics.

Other recommendation engines relate to other features of a fantasy sports game, such as start/sit recommendations, which tend to be based upon a specific expectation of the points scored and are made without reference to the other team in the matchup. That is, they focus on attempting to score the most possible points without any concern about what the other team will do or how likely victory may be.

Fantasy team owners may consult an average draft position chart, which is information that is publicly available, in order to determine whether or not it is safe to wait one more round in order to make their selection or if they would be well-advised to select the player immediately. Most conventional solutions start with a survey of the available players and then a (frequently arbitrary) determination of their differences and similarities. However, this is a fairly manual process; at best, fans can use a "cheat sheet" assembled by a professional research staff (e.g., a news service or content provider) to reduce the burden.

Some fantasy sports owners, when participating in an auction-style draft, will compute players' auction values before the draft and then approximate the necessary adjustments as the draft goes along.

Successful fantasy owners tend to attempt to ascertain what players other owners in their draft are likely to target, and then adjust their draft strategy accordingly. For example, a team that is drafting 9th in a 10-team league will typically also have the 12th pick. With his 9th pick, he is likely to select the player he believes will be most likely to be selected by the team with the 10th and 11th picks, hoping that another player that he covets more than his opponent may still be available at #12. This is particularly important later in the draft. For example, if a team in a fantasy American football league has the 79th and 82nd selections and needs a quarterback, but the team with the 80th and 81st selections already has an elite quarterback on its roster, it is likely advantageous to select a different position for pick number 79, knowing that the team with picks 80 and 81 is unlikely to select a second quarterback.

Fantasy owners in leagues where teams are matched up against a single opponent ("head-to-head" leagues) are used to attempting to pick up players who have additional games during a matchup, or, in fantasy baseball, players who are "two-start" pitchers (starting pitchers that will get two starts during a week; most only get one, so a two-start pitcher is very valuable).

Successful fantasy team owners are aware of various concepts and make use of them when drafting their fantasy teams. For example, with football, it is usually easy to determine whom the principal backup is for a given running back, and charts that include the teams' bye weeks are readily available online.

One conventional scoring system for fantasy sports is "rotisserie" scoring. In this system, the players' object is to accumulate statistics across a predetermined plurality of sports statistics. During the draft, one goal is to build a team that is expected to meet statistical levels that have generated a victory in the past, in the expectation that aggregate statistical levels during the upcoming season will be approximately equal. Fans who are in a league that carries over from year-to-year will sometimes look at last year's standings to approximate this value, but that is of little use to people who are new to the league or who do not have a representative league available to use for comparison. Thus, there is a need for a recommendation engine to provide weighted recommendations in a fantasy sports game environment.

FIG. 3 shows a method 300 for executing a fantasy sports application to draft players as is known in the art. Specifically, the method 300 relates to a fantasy sports application, executed upon a host, which performs each round of the draft, enabling users to select players in a sequential manner; in one embodiment, this may be a conventional "serpentine" manner. In this embodiment, a user who selects first in an odd number round subsequently selects last in an even number round. In step 310, the draft is initialized. In step 320, an owner or user selects a player and the host executing the fantasy sports application receives the selection, for example, through a network via a transceiver. In step 330, a determination is made whether there are further rounds for selections to be made. If the determination in step 330 indicates that more rounds are to be performed, the method 300 returns to step 320 where further selections are received. If the determination in step 330 indicates that no more rounds are to be performed, the method 300 ends.

FIG. 4 shows a method 400 for executing a fantasy sports application to draft players as is known in the art. Specifically, the method 400 relates to a fantasy sports application, executed upon a host, for users to select players in a conventional auction format. Thus, a user is provided a predetermined budget in which to "bid" for a player and the player who provides the highest "bid" receives the player for the owner's team. In step 410, the draft is initialized. In step 420, an owner or user selects a player and the host executing the fantasy sports application receives the selection, for example, through the network via the transceiver. In step 430, the owner or user provides a bid on the player and the host receives the bid.

In step 430, further owners or users who are also interested in drafting the selected player provide bids and the host receives the respective bids. Thus, in step 440, the host determines the user who provided the highest bid, and that user drafts the player. In step 450, a determination is made whether there are empty slots for a respective position related to the sport in the fantasy sports application. If the determination in step 450 indicates that more auctions are to be performed since there are still empty slots, the method 400 returns to step 420 where further selections are received. If the determination in step 450 indicates that no more slots are empty, the method 400 ends.

When using systems implementing the prior art methods discussed above, fantasy team owners may review player rankings from various sources such as journalists, experts, and historical data, or create their own rankings based upon a synthesis thereof, to assist them in their decision making. Prior art systems, however, do not automatically or adaptively synthesize various weighted ranking sources into a player recommendation.

DETAILED DESCRIPTION

Figure 1:
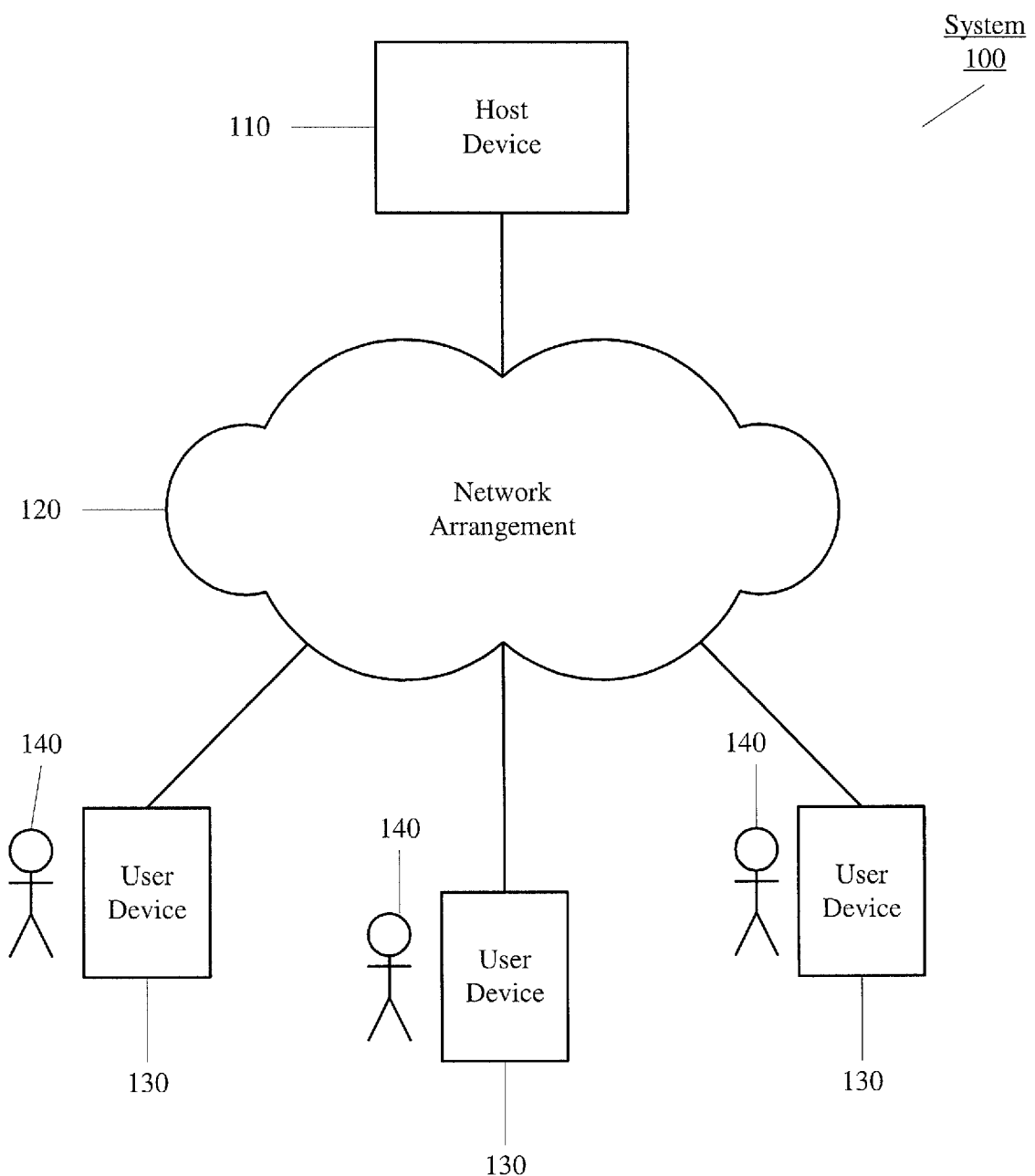
FIG. 1 shows a system in which a fantasy sports application is executed according to an exemplary embodiment of the present invention.

The present invention relates to a method and device for generating a fantasy sports recommendation. The method comprises receiving a plurality of ranking values associated with a sport player. Each of the ranking values is generated from a respective source. The method comprises assigning a weight value to each of the ranking values. The weight value is associated with the respective source. The method comprises generating a recommendation value for the sport player as a function of the ranking values and the corresponding weight values. The method comprises receiving a selection value for the sport player. The method comprises determining a further weight value for each of the sources as a function of the selection value, the recommendation value, and the weight value for the corresponding source.

The exemplary embodiments may be further understood with reference to the following description of the exemplary embodiments and the related appended drawings, wherein like elements are provided with the same reference numerals. The exemplary embodiments are related to a device and method for providing recommendations for players who are drafted in a fantasy sports application. Specifically, the recommendations are provided as a function of a plurality of rankings, each ranking being determined by a respective algorithm. The recommendations are further adjusted as a function of which algorithm is used. While drafting a fantasy sports team, a fantasy team owner must consider a multitude of factors to determine the best possible selection. The exemplary embodiments of the present invention assist in the drafting by providing a set of recommendations that help guide the decision-making process, in a manner useful during a (potentially time-limited) draft.

Initially, it is noted that the terminology used herein for the exemplary embodiments of the present invention are consistent with what was described above. Accordingly, the terms of an "owner" and a "user" may be used interchangeably to refer to a common person who owns a fantasy team. On the other hand, the term of "a player" relates to an actual sport athlete participating in the respective sport of the fantasy sports application.

According to the exemplary embodiments of the present invention, a recommendation engine may provide a single player recommendation or a set of recommended players. As will be described in further detail below, the recommendations may be derived from a variety of sources and tailored for a specific set of rules in use in the league in which a draft is being performed. The rules may be input by the user of the system of the present invention or may be input by a user (i.e., a fantasy team owner) in an exemplary embodiment where the user is participating in a game that is not run by the system owner. In the exemplary embodiments where the rules are integrated into the system that is administering the fantasy league, the recommendations may appear inside the draft client and, therefore, be available to be accessed at any time without having to use an external source.

The fantasy sports application may be an interface provided on a client. Accordingly, the client may be executed on an electronic device that is configured with a transceiver to connect the device to a network. FIG. 1 shows a system 100 in which the fantasy sports application may be executed. As shown in FIG. 1, a plurality of users 140 may each have a user device 130 that is configured to communicate with a communication network arrangement 120, for example, via a wired or wireless connection. The network 120 may include or connect to a host device 110 that is configured to execute the fantasy sports application. As will be described in further detail below, the fantasy sports application may be configured to provide recommendations to the users 140. Accordingly, the host 110 may be connected or have access to a plurality of different sources of data that is used to provide the recommendations. It should be noted that the use of three users 140 and respective user devices 130 is only exemplary. Those skilled in the art will understand that the system 100 may include any number of users 140 and user devices 130 who participate in the fantasy sports application.

The network 120 may be any type of network configuration capable of connecting the plurality of user devices 130. In a first exemplary embodiment of the present invention, the host 110 may be a website. Accordingly, the network 120 may be the Internet (e.g., WAN). In this exemplary embodiment, the network 120 may include a plurality of network components such as a server, a database, a network management arrangement, a plurality of access points, etc. In a second exemplary embodiment of the present invention, the host 110 may be an electronic device (e.g., server terminal) operated by a user. Accordingly, the network 120 may be a local area network (LAN). In this exemplary embodiment, the network 120 may include a hub that is configured to connect the user devices 130 to the host 110 for data to be exchanged thereamong.

Figure 2:
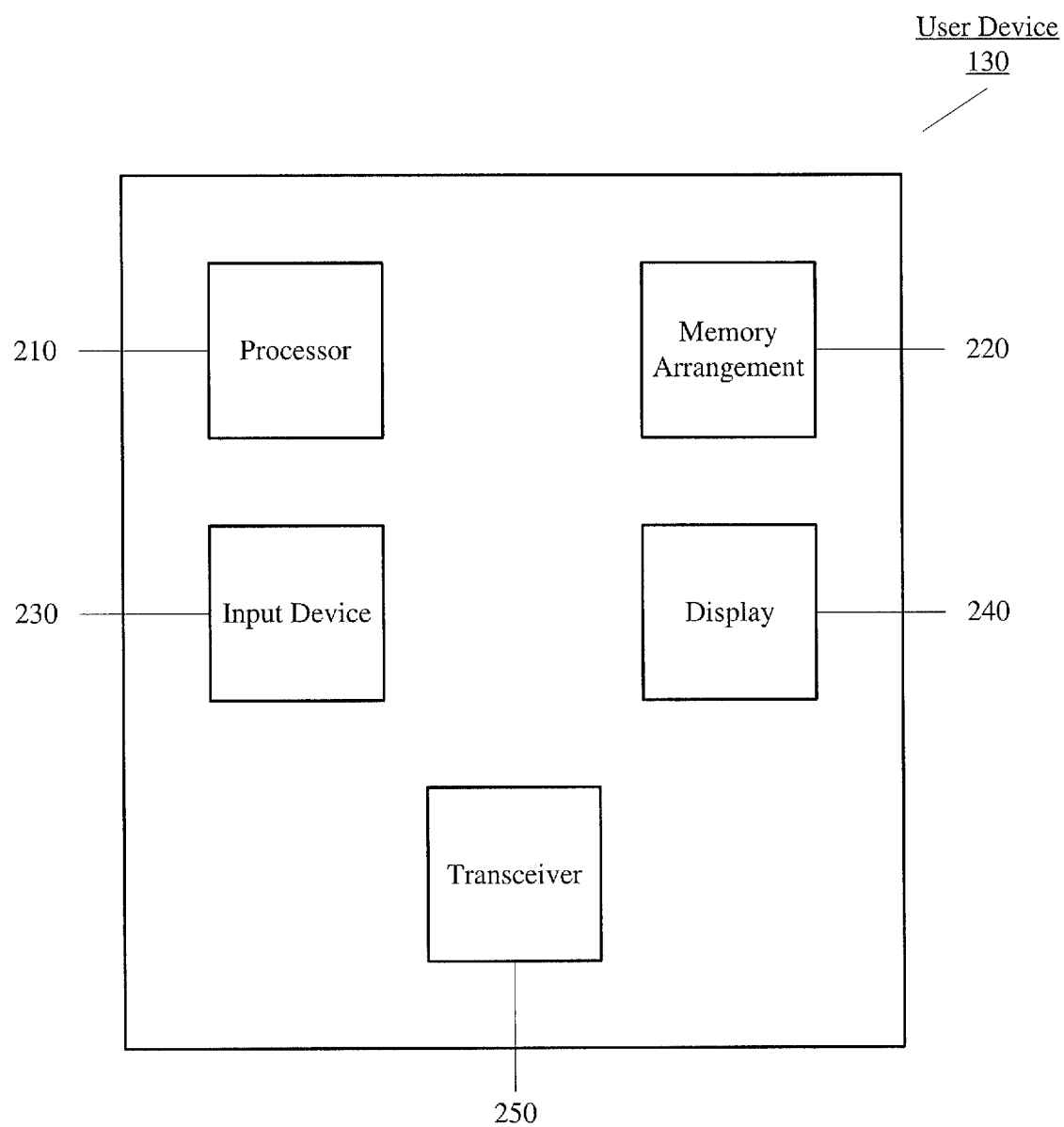
FIG. 2 shows a user device that connects to a host of FIG. 1 for the fantasy sports application according to an exemplary embodiment of the present invention.
Figure 3:
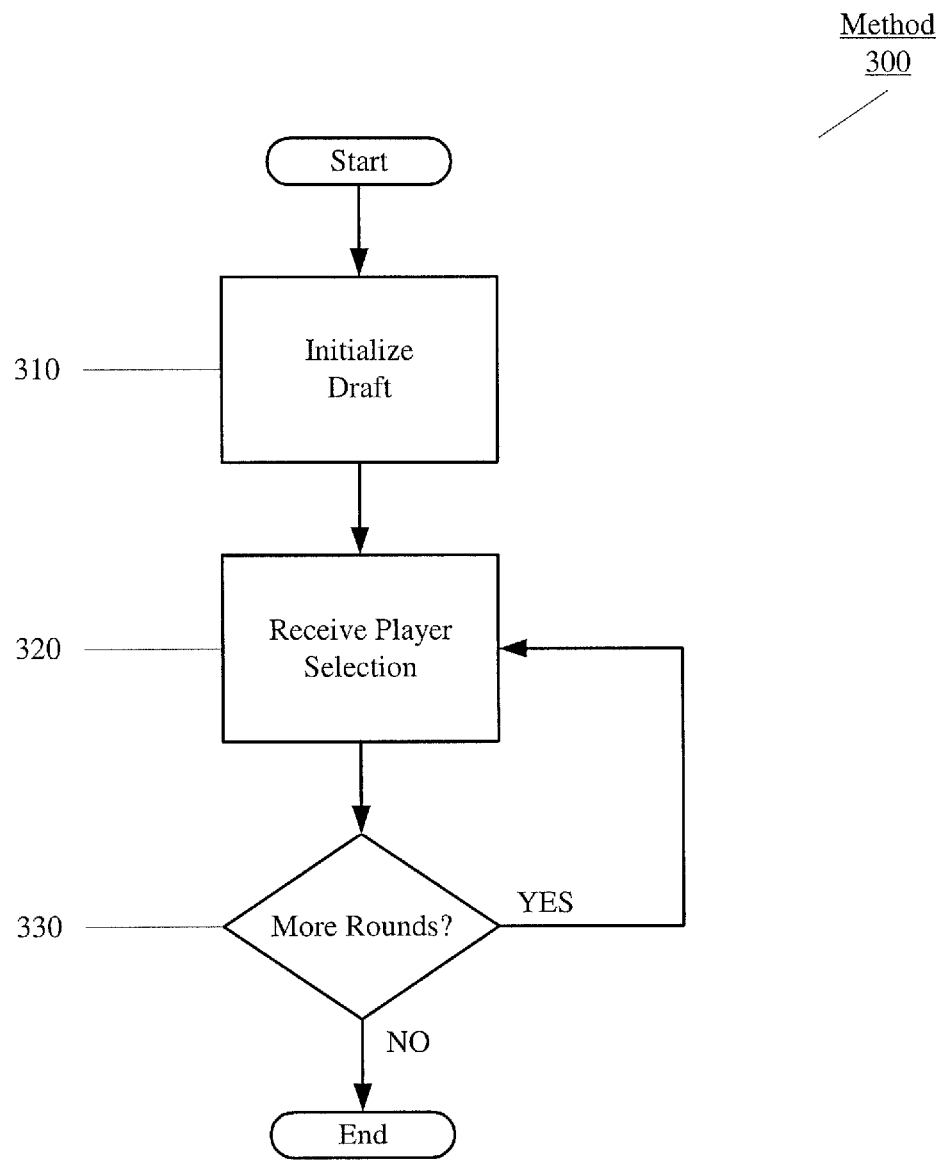
FIG. 3 shows a first conventional method for executing a fantasy sports application to draft players.
Figure 4:
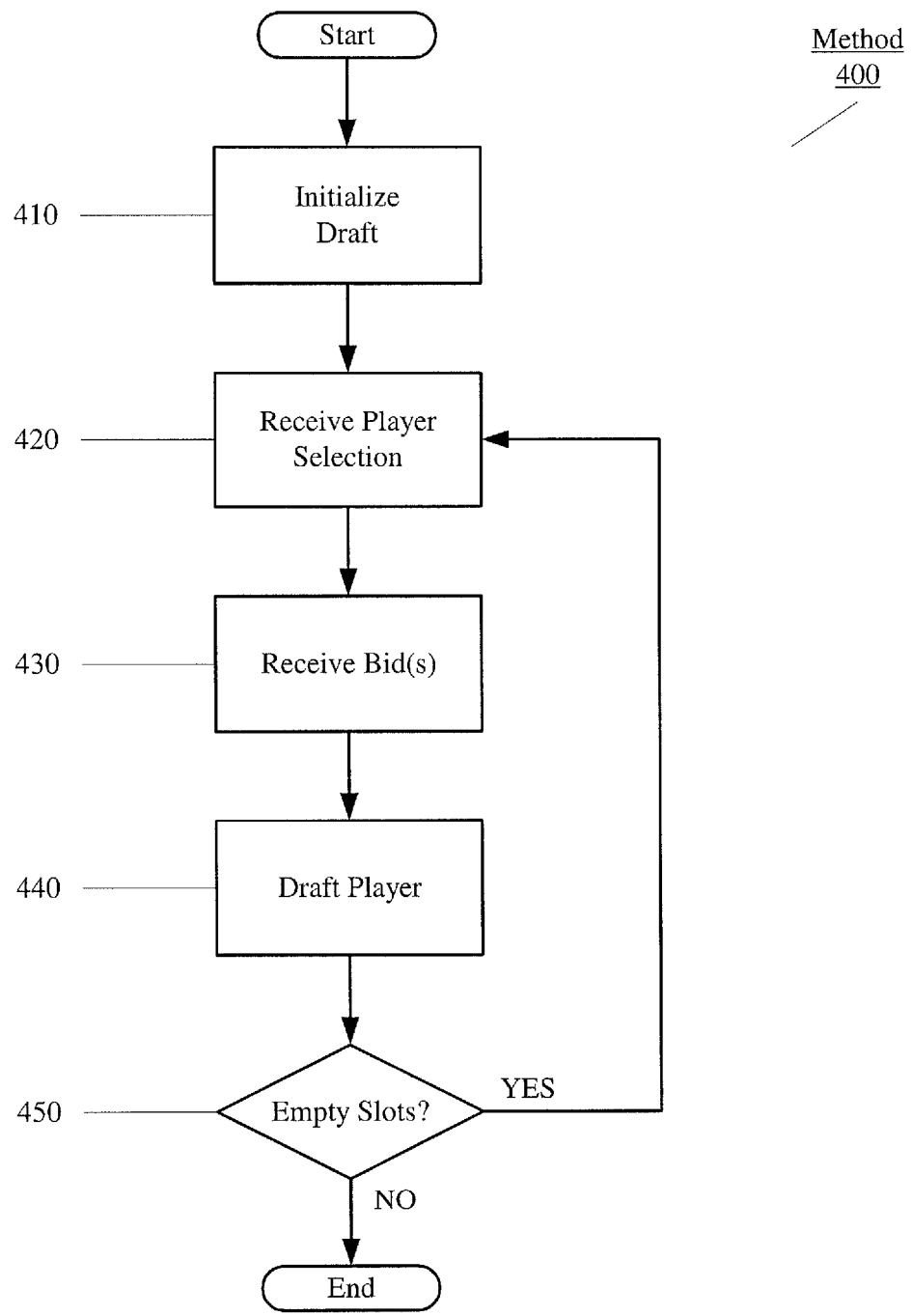
FIG. 4 shows a second conventional method for executing a fantasy sports application to draft players, where the method depicted is an auction-style draft.

FIG. 2 shows one of the user devices 130 that connects to the host 110 and shows the interface for the fantasy sports application according to an exemplary embodiment of the present invention. The user device 130 may be any electronic device such as a computer terminal, a laptop, a personal digital assistant, a tablet, a cellular phone, etc. The user device 130 may also operate using any operating system such as Windows, Mac OS, Linux, Android, iOS, etc. That is, the recommendation engine according to the exemplary embodiments of the present invention may be adapted for any platform used by the user device 130. It should also be noted that the recommendation engine according to the exemplary embodiments of the present invention may also be adapted to any fantasy sports game that is run on the host 110. The user device 130 may include a processor 210, a memory arrangement 220, an input device 230, a display 240, and a transceiver 250. It should be noted that the user device 130 may include further components; for example, when the user device is a portable electronic device, a power supply may be included. It should also be noted that the input device 230 and the display 240 may be embodied together, for example, in a touch screen configured to perform both functionalities.

The processor 210, the memory 220, the input device 230, the display 240, and the transceiver 250 may all provide conventional functionalities for the user device 130. For example, the processor 210 may execute the interface for the fantasy sports application. In another example, the processor 210 may execute a browser application in which the fantasy sports application is executed thereon. The transceiver 250 may exchange data through the network 120 with the host 110, in particular to receive data related to the fantasy sports application as well as the recommendations generated by the recommendation engine, as will be discussed in further detail below.

Figure 5:
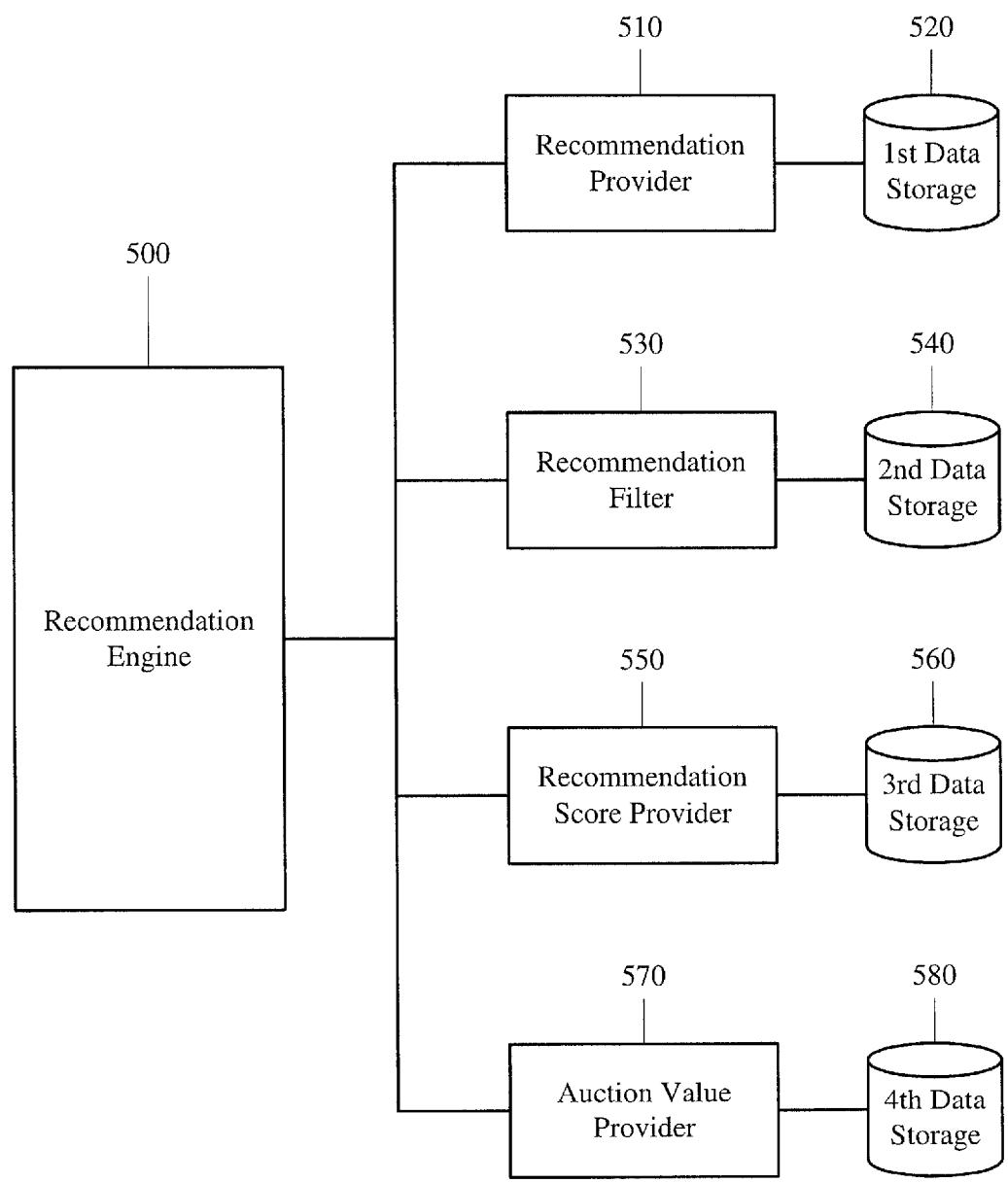
FIG. 5 shows a recommendation engine according to an exemplary embodiment of the present invention.

While performing the draft as described in one of the methods above, the host 110 may include a recommendation engine that provides one or more recommendations for the users to determine an optimal selection of one or more players. FIG. 5 shows a recommendation engine 500 that is configured to provide the recommendations according to an exemplary embodiment of the present invention. The recommendation engine 500 may be incorporated as part of the host 110 or may be a separate utility of the fantasy sports application. The recommendation engine 500 may also be configured to access or be connected to a plurality of data sources. For example, the data may be related to past ranking values of a player as a function of performance from previous seasons. In another example, the data may be related to current ranking values of a player as assessed by other leagues in the sport of the fantasy sports application. In yet another example, the data may be related to ranking values as determined by "experts" in the sport. It should be noted that there are many other sources of data that provide ranking values of players that the recommendation engine may consider prior to generating the recommendations to the users 140. The recommendation engine 500 may incorporate the above noted ranking values in order to generate an overall recommendation for a particular player or group of players to the users 140.

As will be discussed in further detail below, the sources may each utilize a specific algorithm to determine the respective ranking values. The recommendation engine 500 may include weight values assigned to each source, and thus algorithm, to emphasize a particular ranking value over a different ranking value so that the recommendation reflects these weight values. For example, between two ranking values, if a first ranking value for a player recommends that the player should be drafted in a first position while a second ranking value for the player recommends that the player should be drafted in a fourth position, but the first ranking value is weighted more, the recommendation engine 500 may generate an overall recommendation value in which the player is recommended to be drafted in a position closer to what the first ranking value suggests.

For the recommendation engine 500 to ultimately generate recommendations, the recommendation engine 500 may utilize a plurality of processors that provide data thereto. Specifically, each of the plurality of processors may be sources of analyzed data that the recommendation engine 500 uses to generate the recommendations. As illustrated in FIG. 5, a plurality of processors may include a recommendation provider 510 connected to a first data storage 520, a recommendation filter 530 connected to a second data storage 540, a recommendation score provider 550 connected to a third data storage 560, and an auction value provider 570 connected to a fourth data storage 580. Because the recommendation engine 500 is designed with multiple componentized interfaces, additional ranking techniques and weights to the system may be added easily by, e.g., the owner. If required, further processors may also be incorporated for the recommendation engine 500. By receiving the analyzed data from the plurality of processors listed above, the recommendation engine 500 may analyze the data to generate the recommendations by further incorporating the weights associated with each ranking value provided by the plurality of processors 510, 530, 550, 570 according to the exemplary embodiments of the present invention. Note that the separation into various processors 510, 530, 550, and 570, and various data storages 520, 540, 560, 580, is merely exemplary. Those skilled in the art will understand that any of these processing functions may be subcomponents of a single processor, and that any number of data storages may be physically maintained in a single unit. Note further that any of the processors 510, 530, 550, and 570, and the associated data storages 520, 540, 560, and 580, may be replicated and configured independently, such that any number of processors and data storages may be linked in an embodiment of the invention.

According to the exemplary embodiments of the present invention, the recommendation engine 500 may provide a recommendation to the users 140 to make a determination in drafting a player. Whether a serpentine method or an auction method is used to draft the player, the recommendation may be generated as a function of the plurality of ranking values received by the recommendation engine 500. When there is no prior data related to the user 140, the recommendation engine 500 may apply a predetermined weighting to the ranking values. In a first example, an even weight distribution may be used for each of the ranking values. Thus, with four ranking values being received, each ranking value may be assigned a weight of 25%. In a second example, a weight distribution most commonly used by users on the host may be used. Thus, with the four ranking values being received, the first ranking value may be predetermined to be assigned a weight of 30%, the second ranking value may be 15%, the third ranking value may be 35%, and the fourth ranking value may be 20%. In a third example, an expert in the field may assign a predetermined weight to each algorithm based upon personal experience, preference, or ideas.

The recommendation engine 500 may subsequently determine the recommendation(s) to provide to the user 140 as a function of the ranking values from the plurality of sources and the respective weights assigned thereto. Accordingly, each selection made by the user 140 may reflect a decision that corresponds to one of the ranking values used to generate the recommendation. The recommendation engine 500 may accumulate the selections made by the user and determine the frequency with which a particular ranking value from a source is used for making the selection. Subsequently, as described in further detail below, the recommendation engine 500 may adjust the weights assigned to the ranking values in order to generate a recommendation that is more tailored to the preferences of the user. In a case where the user 140 makes a selection where the recommendation is not viewed or otherwise used, the recommendation engine 500 may consider such a selection irrelevant and remove this selection from the adjustment to the weights of the ranking values.

In a specific example of the above exemplary embodiment of the present invention, an exemplary ranking system assigns each player a score from 0 to 100, 100 being a perfect score. This score may be determined by the recommendation score provider 530 according to the specific configuration of that provider, acting upon information provided by the recommendation providers 510, understanding that multiple recommendation score providers 530 may exist in a system and that each may be configured independently, resulting in different scores. For example, one recommendation provider 510 may produce an ordered list of players expected to provide the most value relative to their peers, and one recommendation score provider 530 may then scale this value to the 0-100 scale to produce a score. For a particular first player, a first ranking value may be 99, highest among all players; a second ranking value may be 91, third-best among all players; and a third ranking value may be 74, tenth among all players. At this stage, the recommendation engine may equally distribute the weights to these ranking values as 33% each, for an aggregate score of 88. For a particular second player, a first ranking value may be 90, third among all players; a second ranking value may be 92, second among all players; and a third ranking value may be 94, first among all players, for an aggregate score of 92. These may be two of the highest aggregate scores from amongst the entire body of available players. The recommendation engine 500 may then present these to the user as recommendations, ordered such that the second player was ranked better than the first player. If the user selects the first player, the recommendation engine 500 may adjust the weights assigned to the ranking values. For example, the weight of the first ranking value may be increased (even significantly since it gave a very high score to the first player who was eventually the selection of the user), the weight of the second ranking value may be decreased slightly (the first player eventually selected was rated highly by this algorithm but was not its primary recommendation), and the weight of the third ranking value may be decreased significantly (as the ranking value was, by far, the lowest of the three). Accordingly, the recommendation engine 500 may now distribute the weights so that the source providing the first ranking value is at 60%, the source providing the second ranking value is at 25%, and the source providing the third ranking value is at 15%. When it is time for a following turn of the user 140, the recommendation engine 500 may utilize the adjusted weights to determine the recommendation from the ranking values.

It should be noted that the recommendation engine 500 may require more than a single selection by the user 140 to determine an adjustment of the weights to the ranking values. Thus, the recommendation engine 500 may allow the user 140 to make a plurality of selections using a common weight distribution to the ranking values before making the adjustments to the weights.

It should also be noted that the weight adjustments for the user 140 is only exemplary. According to the exemplary embodiments of the present invention, the recommendation engine 500 may adjust the weights assigned to the ranking values in a variety of ways. In a first example and as described above, the weights of the ranking values used to determine a recommendation for a single user 140 may be made. In a second example, the weights of the ranking values used to determine a recommendation may be made for every user 140 of a particular league. In such an example, the recommendation engine 500 may collect a plurality of selections made by each of the users 140 in the league prior to determining the adjustments to the weights. In a third example, the weights of the ranking values used to determine a recommendation may be made for the system as a whole. In such an example, the recommendation engine 500 may collect a plurality of selections made by each of the users 140 spanning a plurality of leagues that are part of the system prior to determining an adjustment to the weights.

It should further be noted that the recommendation engine 500 generating a single recommendation from the ranking values is only exemplary. Using the interface described above, the recommendation engine 500 may display several recommended players to the user 140, arranged in order of their aggregate score. The user 140 may further be informed of each source upon which the ranking value is being based. In this exemplary embodiment of the present invention, the recommendation engine 500 may receive a selection from the user 140 which includes information about whether or not the user viewed the recommendations and which recommended player is being selected. Accordingly, subsequent recommendations may be shown by the recommendation engine 500 in a list where the weighted scores of the ranking values dictate the order in which the list is displayed. It should also be noted that the recommendation engine 500 may simply determine if the user 140 makes a manual decision since a recommendation shown in the list is not used; alternatively, the information provided from the user 140 may indicate that the recommendations were not used (e.g., a graphical user interface that displays the recommendations is not activated or viewed by the user 140), in which case the selection may be considered to be manual even if it matches the player recommended by one or more algorithms.

Figure 6:
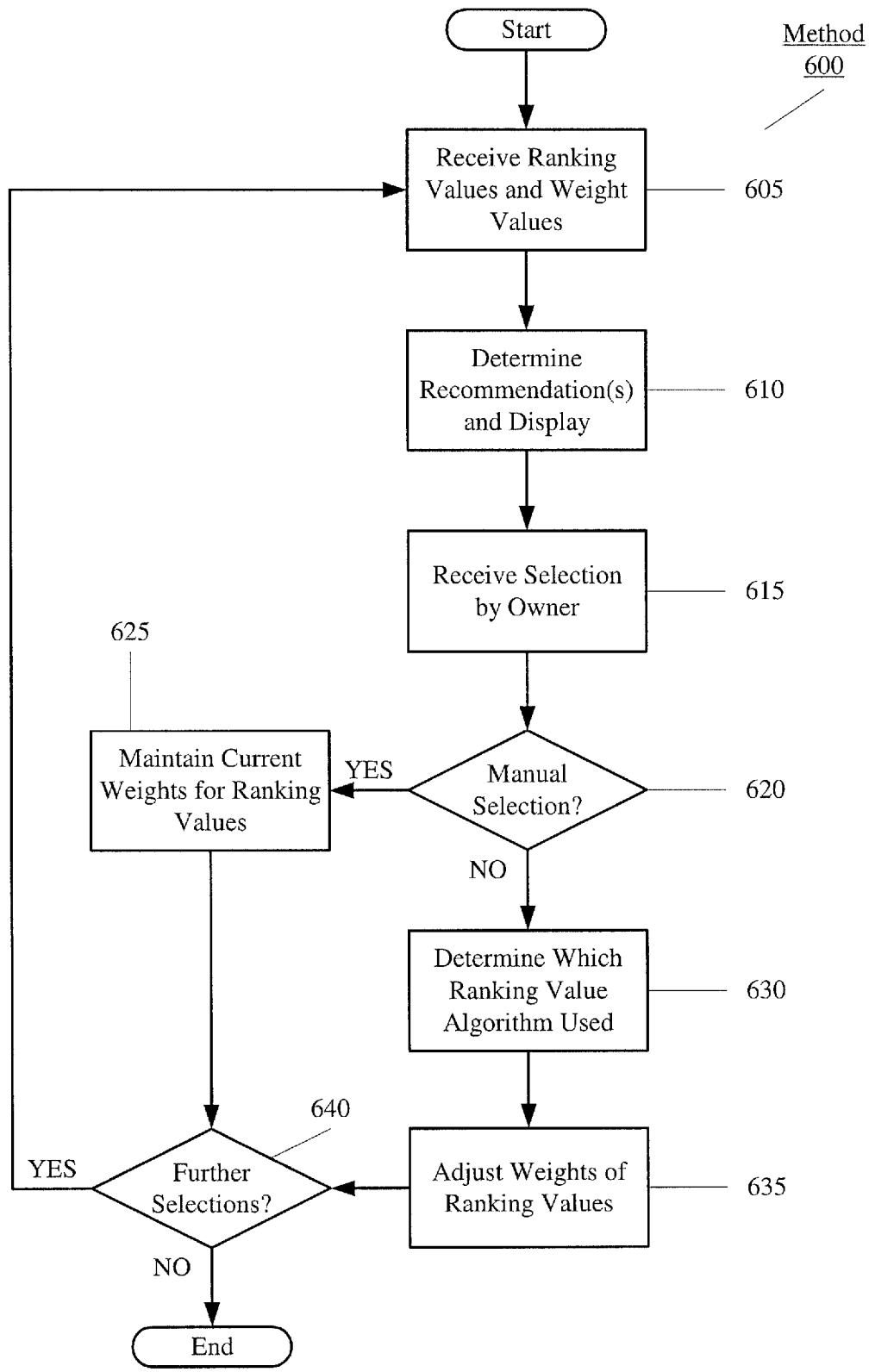
FIG. 6 shows a method for adjusting weights of ranking values used to determine a recommendation according to an exemplary embodiment of the present invention.

FIG. 6 shows a method for adjusting weights of ranking values used to determine a recommendation according to an exemplary embodiment of the present invention. The method 600 will be described with reference to the recommendation engine 500 of FIG. 5. It should be noted that the method 600 relates to the above-described exemplary embodiment of the present invention in which the recommendation engine 500 generates a list of recommendations for the user 140.

In step 605, the recommendation engine 500 receives a plurality of ranking values and weight values. As described above, the recommendation engine 500 may be connected to any number of processors 510, 530, 550, 570. These processors may provide ranking values or general player data. In step 610, the recommendation engine 500 determines one or more recommendations and displays the recommendation(s) to the user 140 via the interface. As discussed above, the recommendation engine 500 may utilize a predetermined set of weights associated with each ranking value to determine the recommendation. For example, an initial set of weights may be an even distribution. In another example, a weight distribution for the entire league including all the owners 140 may be used. In a further example, the initial set of weights may be selected by an expert in the field and fixed for all users.

In step 615, the user 140 may make a selection that is received by the recommendation engine 500. As discussed above, the user 140 may not utilize the recommendation, and may make a manual selection. For example, the user 140 may not even view the recommendations shown in step 610 or invoke the recommendation interface showing the recommendations. Thus, in step 620, a determination is made whether the selection made by the user 140 was a manual one using, for example, whether the recommendations were viewed by the user 140. If the selection is manual, the method 600 continues to step 625. In step 625, the recommendation engine 500 maintains the current weights for the ranking values.

Returning to step 620, if the selection is not manual, the method 600 continues to step 630. In step 630, the recommendation engine 500 may determine the ranking value that was used or reflected by the selection of the user 140. As discussed above, when a plurality of ranking values are used to generate a single recommendation and the selection by the user coincides or substantially coincides with one of the ranking values, the recommendation engine 500 may determine that one ranking value was used over the other ranking values. In step 635, the recommendation engine 500 may adjust the weights of the ranking values as a function of the selection made in step 615.

After either step 625 or 635, the method 600 continues to step 640. In step 640, a determination is made whether further selections are to be made. As discussed above, a team of the user 140 may include a variety of slots for players. When there are further selections to be made, the method 600 returns to step 605 and the ranking values are again received. It should be noted that an iteration of the method 600 at this point will utilize the adjusted weights of the ranking values determined in step 635 when the recommendation is determined in step 610. When no further selections are to be made, the method 600 ends.

The exemplary embodiments of the present invention provide a recommendation engine that receives a plurality of different ranking values from a plurality of different sources so that a recommendation may be generated as a function of these ranking values and respective weight values associated therewith. The recommendation engine may adjust the weight values assigned to each of the plurality of sources as subsequent selections are made. Accordingly, a source which generates ranking values most similar to the selections eventually made by users may have a higher weight associated therewith so that the recommendation generated by the recommendation engine better reflects the users' preference for the source. For example, the system may be configured such that a source that generates ranking values that correlate with an actualized user selection twice as frequently as another source may receive a weight that is twice as large. The weights of the ranking values may have a predetermined initial value prior to any adjustments made thereto. The weights assigned to each source may also be adjusted after at least one selection is made to base the adjustments. These adjustments to the weights assigned to each source may be done for each individual user, for a particular league including a plurality of players, or even for the system as a whole including a plurality of leagues.

Those skilled in the art will understand that the above-described exemplary embodiments may be implemented in any number of manners, including, as a separate software module, as a combination of hardware and software, etc. For example, the recommendation engine may be a program containing lines of code that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A device, comprising:
a communication arrangement configured to communicate via a communication network;
a memory arrangement; and
a processor configured to execute a fantasy sports application,
wherein the processor receives a plurality of ranking values being generated from a respective source;

wherein the processor assigns a weight value to each of the ranking values, the weight values being associated with the respective source;
wherein the processor generates a recommendation value for the sport player as a function of the ranking values and the corresponding weight values;
wherein the processor receives a selection value for the sport player; and
wherein the processor determines a further weight value for each of the sources as a function of the selection value, the recommendation value, and the weight value for the corresponding source.

2. The device of claim 1, wherein the weight values have a predetermined initial value.

3. The device of claim 2 wherein the predetermined initial value is an equal distribution among the sources.

4. The device of claim 1, wherein, prior to the determining of the further weight values, the processor repeats the receiving of the selection value step until a predetermined number of selections are received.

5. The device of claim 1, wherein the processor receives a plurality of further ranking values associated with a further sport player, assigns the further weight values to each of the further ranking values, and generates a further recommendation value for the further sport player as a function of the further ranking values and the corresponding further weight values.

6. The device of claim 1, wherein the recommendation value is determined as a single, final ranking value.

7. The device of claim 1, wherein the processor receives a plurality of respective ranking values associated with at least one further sport player and generated a list of the sport players sorted so that a first one of the sport players having a higher respective recommendation value is placed before a second one of the sport players having a lower recommendation value.

8. The device of claim 1, wherein the weight values and the further weight values are associated with one of a single user, a league of users, and a system of leagues.

9. The device of claim 1, wherein the further weight values are the same as the weight values when the selection value is unrelated to the recommendation value.

10. A computer readable storage medium including a set of instructions executable by a processor, the set of instructions operable to:
receive a plurality of ranking values associated with a sport player, each of the ranking values being generated from a respective source;
assign a weight value to each of the ranking values, the weight value being associated with the respective source;
generate a recommendation value for the sport player as a function of the ranking values and the corresponding weight values;
receive a selection value for the sport player;
determine a further weight value for each of the sources as a function of the selection value, the recommendation value, and the weight value for the corresponding source.

11. The computer readable storage medium of claim 10, wherein the weight values have a predetermined initial value.

12. The computer readable storage medium of claim 11, wherein the predetermined initial value is an equal distribution among the sources.

13. The computer readable storage medium of claim 10, wherein, prior to the determining of the further weight values, the receiving of the selection value step is repeated until a predetermined number of selections are received.

14. The computer readable storage medium of claim 10, the set of instructions further operable to;
receive a plurality of further ranking values associated with a further sport player;
assign the further weight values to each of the further ranking values; and
generate a further recommendation value for the further sport player as a function of the further ranking values and the corresponding further weight values.

15. The computer readable storage medium of claim 10, wherein the recommendation value is determined as a single, final ranking value.

16. The computer readable storage medium of claim 10, the set of instructions further operable to;
receive a plurality of respective ranking values associated with at least one further sport player; and
generate a list of the sport players sorted so that a first one of the sport players having a higher respective recommendation value is placed before a second one of the sport players having a lower recommendation value.

17. The computer readable storage medium of claim 10, wherein the weight values and the further weight values arc associated with one of a single user, a league of users, and a system of leagues.

18. The computer readable storage medium of claim 10, wherein the further weight values are the same as the weight values when the selection value is unrelated to the recommendation value.

19. The computer readable storage medium of claim 10, wherein the weight values are initially determined as a function of a plurality of prior selection values.

* * * * *